(12) United States Patent
Rabut

(10) Patent No.: US 10,520,750 B2
(45) Date of Patent: Dec. 31, 2019

(54) HINGE FOR SPECTACLES AND CORRESPONDING SPECTACLES

(71) Applicant: VRM LUNETTERIE, Morbier (FR)

(72) Inventor: Florent Rabut, Cize (FR)

(73) Assignee: VRM LUNETTERIE, Morbier (FR)

( * ) Notice: Subject to any disclaimer, the term of this patent is extended or adjusted under 35 U.S.C. 154(b) by 0 days.

(21) Appl. No.: 15/759,378

(22) PCT Filed: Sep. 9, 2016

(86) PCT No.: PCT/FR2016/052273
§ 371 (c)(1),
(2) Date: Mar. 12, 2018

(87) PCT Pub. No.: WO2017/042510
PCT Pub. Date: Mar. 16, 2017

(65) Prior Publication Data
US 2018/0252940 A1 Sep. 6, 2018

(30) Foreign Application Priority Data

Sep. 11, 2015 (FR) ...................................... 15 58501

(51) Int. Cl.
*G02C 5/22* (2006.01)
*G02C 11/00* (2006.01)

(52) U.S. Cl.
CPC ............. *G02C 5/2281* (2013.01); *G02C 5/22* (2013.01); *G02C 11/10* (2013.01)

(58) Field of Classification Search
CPC ....... G02C 5/22; G02C 5/2209; G02C 5/2281
USPC ................................ 351/119, 121, 140, 153
See application file for complete search history.

(56) References Cited

U.S. PATENT DOCUMENTS

| 4,832,478 A * | 5/1989 | Salce | ..................... G02C 5/146 |
| | | | 16/228 |
| 2008/0013041 A1 | 1/2008 | Chou | |
| 2014/0028966 A1 * | 1/2014 | Blum | ..................... G02C 7/083 |
| | | | 351/121 |

FOREIGN PATENT DOCUMENTS

| WO | WO97/35085 A1 | 9/1997 |
| WO | WO01/35159 A1 | 5/2001 |
| WO | WO2013/188805 A2 | 12/2013 |

OTHER PUBLICATIONS

International Search Report and Written Opinion for PCT Patent App. No. PCT/FR2016/052273 (dated Nov. 25, 2016) with English language translation of the ISR.

* cited by examiner

*Primary Examiner* — Darryl J Collins
(74) *Attorney, Agent, or Firm* — Kenealy Vaidya LLP

(57) ABSTRACT

Some embodiments are directed to a hinge for spectacles including an optical frame front and at least one temple linked to a tenon of the optical frame front, the hinge including a first part linked to the tenon and a second part linked to the temple, the first part and the second part being linked by a link device mounted along an axis of the hinge and being movable between an open position and a closed position; when passing from the open position to the closed position, an opening is formed between the outer surfaces of the first and second parts. The first and second parts each include a conduit opening opposite each other in the open position, and the hinge includes a hinge member mounted along the hinge axis between the first part and the second part.

20 Claims, 5 Drawing Sheets

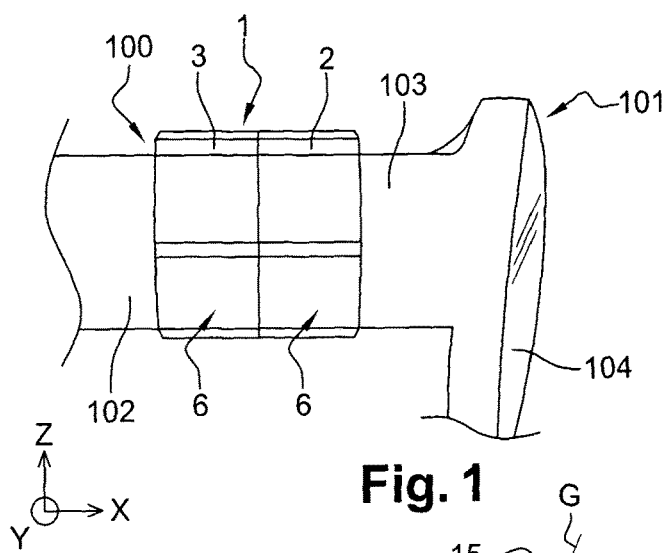
Fig. 1
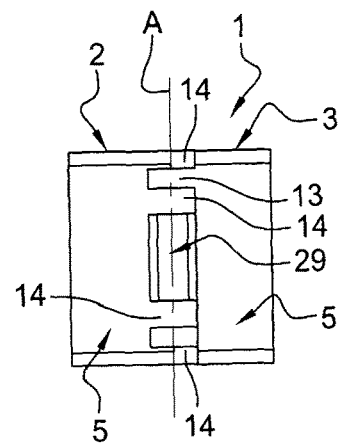
Fig. 2
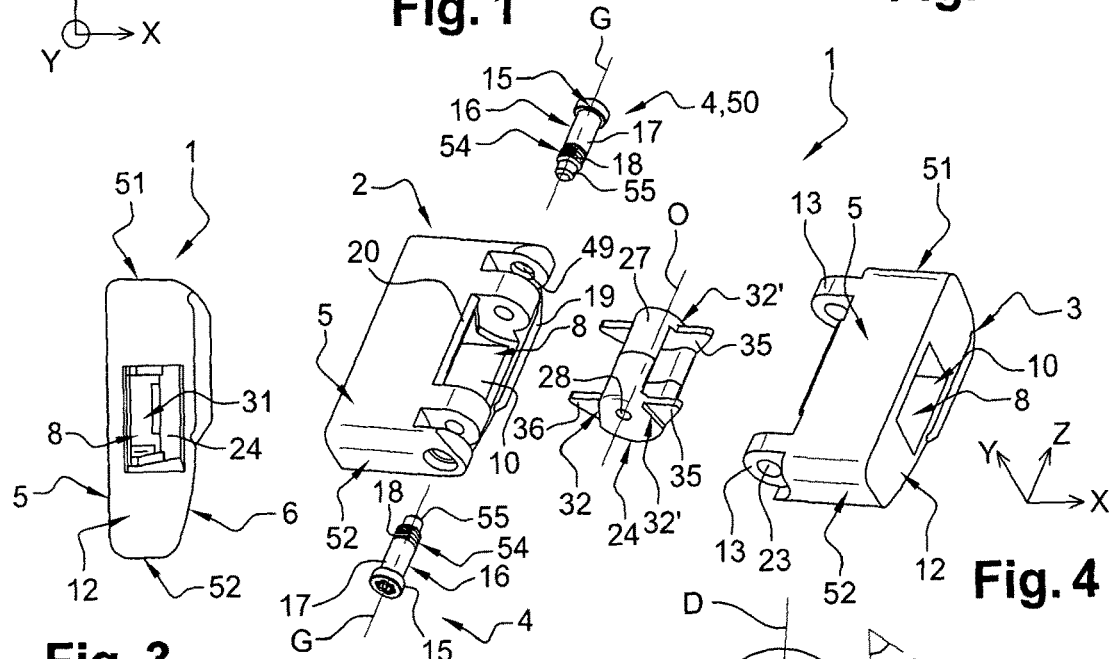
Fig. 3
Fig. 4
Fig. 5
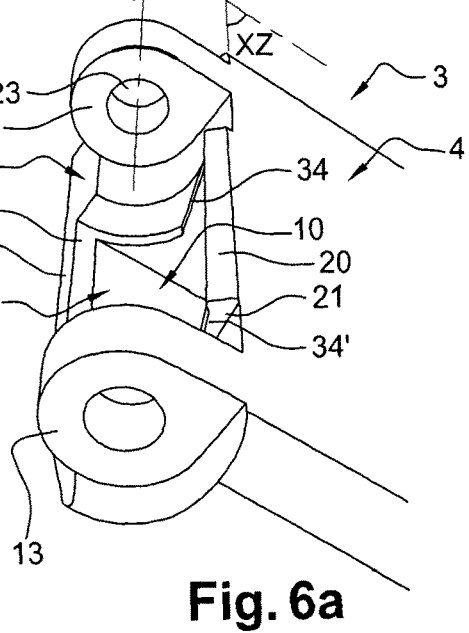
Fig. 6a

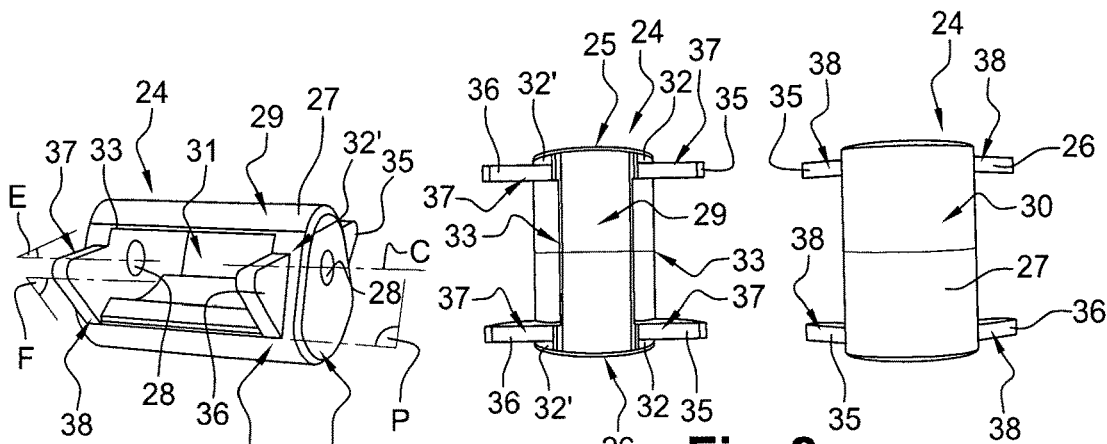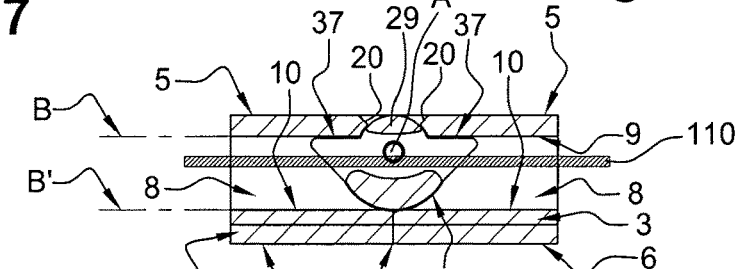

HINGE FOR SPECTACLES AND CORRESPONDING SPECTACLES

CROSS REFERENCE TO RELATED APPLICATIONS

This application is a national phase filing under 35 C.F.R. § 371 of and claims priority to PCT Patent Application No. PCT/FR2016/052273, filed on Sep. 9, 2016, which claims the priority benefit under 35 U.S.C. § 119 of French Patent Application No. 1558501, filed on Sep. 11, 2015, the contents of each of which are hereby incorporated in their entireties by reference.

BACKGROUND

Some embodiments relate to optics, and particularly to eyeglasses equipped with electronic and/or electrical components. Some embodiments relate to a hinge for eyeglasses that include an optical cover and at least one temple connected to the cover. Some embodiments relate to corresponding eyeglasses.

The related art includes eyeglasses equipped with electronic and/or electrical components interacting with, for example, the optical cover of the eyeglasses, such as disclosed in US 2014/0028966, which discloses an eyeglass hinge. The eyeglasses include an optical cover and at least one temple connected to a pin of the optical facade. The hinge includes a first portion connected to the pin and a second portion connected to the temple, the first portion and the second portion being interconnected by two screws mounted along a hinge axis and being movable between an open position and a closed position. Each first portion and second portion includes an outer surface which faces the outside environment of the eyeglasses. When the first portion and the second portion move from the open position to the closed position, an opening is formed between the outer surfaces. These eyeglasses also include a flexible cable for connecting electronic components which are coupled to the optical cover and a power source arranged at the temple thereof. The flexible cable extends between the optical cover and the temple of the eyeglasses, and in particular in a groove provided for this purpose on the outer surfaces of the first portion and the second portion.

SUMMARY

One disadvantage of such eyeglasses, particularly of the hinge, is the fact that the rabbet of the external surfaces of the first portion and the second portion in which the flexible cable is mounted does not allow for effective guidance thereof, which may cause a twist in the flexible cable. The latter also passing behind the hinge and on the outer surfaces is visible from the outer surfaces. The flexible cable is more visible when the opening is formed at the moment of closing or opening of the first portion and the second portion. Furthermore, this weakens the flexible cable which is exposed to the external environment, which is mechanically stressed during opening and closing, and which and makes the cable accessible to all. Added to this is the fact that the cable being visible is not very aesthetically pleasing.

Some embodiments therefore provide a hinge for eyeglasses, which is configured to enable a device for transferring electric and/or electronic information to be installed, and wherein the hinge provides for guidance and protection in all positions while being aesthetically pleasing.

Some embodiments are therefore directed to an eyeglass hinge including an optical cover and at least one temple connected to a pin of the optical cover, the hinge including a first portion connected to the pin and a second portion connected to the temple, the first portion and the second portion being connected by a connector mounted along an axis of the hinge and being movable between an open position and a closed position, when moving from the open position to the closed position, an opening is formed between the outer surfaces of the first portion and the second portion, the first portion and the second portion each including a conduit opening opposite each another in the open position, and the hinge including a hinge member mounted along the axis of the hinge between the first portion and the second portion, the hinge member including an outer wall closing the opening in any position between the open or closed position.

This solution addresses or solves the aforementioned problem. Thus, this configuration makes it possible to close the opening formed when the first portion and the second portion move from a closed position to an open position and vice versa. In particular, this configuration makes it possible to cover and thereby protect the opening created when closing or opening in all positions. It is therefore easily possible to install device for electric and/or electronic information transfer connecting components installed at the optical cover and at the temple in the hinge without the latter being exposed to the external environment in all positions. Furthermore, covering the opening enhances or improves the eyeglasses' aesthetic appeal.

According to a first embodiment, the first portion and the second portion each include an opening abutment surface and a closure abutment surface arranged respectively one opposite the other, the opening abutment surfaces being adapted to be in contact in the open position and the closure abutment surfaces being adapted to be in contact in the closed position. Such a configuration prevents any mechanical stress on the hinge member during opening and closing of the first portion and the second portion.

According to a feature of this first embodiment, the connector includes two screws mounted along the axis of the hinge so as to maintain and allow pivoting of the first portion and the second portion.

According to a second embodiment, the connector includes a screw mounted along the axis of the hinge so as to facilitate and simplify assembly of the hinge.

According to one characteristic, the hinge member has a longitudinal axis and includes at least two holes the axes of which are parallel to the longitudinal axis, the pivot member being pivotally mounted on the screw(s) via holes. In this way the hinge member is freely mounted pivotably.

According to one characteristic, the hinge member has a cylindrical shape. This configuration allows advantageously or preferably, but not restrictively, to allow for the arrangement of the hinge member between the first portion and the second portion and the pivoting thereof in the conduits.

According to another characteristic, the hinge member includes a port extending through the body of the hinge member along a direction transverse to the longitudinal axis of the hinge member. The port advantageously or preferably allows the insertion, the passage and guidance of an electronic and/or electrical information transfer device from one conduit to the other. Furthermore, the port can hide and protect the electronic and/or electrical information transfer device.

According to one characteristic, the hinge includes a first range limiting device for the hinge member in the open position.

Advantageously or preferably, but not restrictively, the first range limiting device of the hinge member includes at least two lateral surfaces arranged on the outer wall of the hinge member, on either side of the longitudinal axis of the hinge member, and at least two lateral faces respectively arranged on a first portion and a second portion. Such an arrangement also makes it possible to stabilize and secure the position of the first and second portions in the open position.

According to another characteristic, the hinge includes a second range limiting device for the hinge member in the open position.

Advantageously or preferably, but not restrictively, the second range limiting device for the hinge member includes:
- a first abutment surface located on one side of a first fin, respectively, and a second fin of at least one pair of fins; the first fin, and the second fin are arranged on the outer wall of the hinge member on either side of the longitudinal axis; and,
- a first surface formed by each conduit, each first abutment surface being in contact with the respective first surface of the conduits in the open position.

This configuration also helps to stabilize and secure the position of the first and second portions in the open position.

According to one characteristic, the hinge includes a third range limiting device for the hinge member in the closed position.

Advantageously, but not restrictively, the third device for limiting the range of the hinge member includes a second abutment surface arranged on one side respectively of the first fin and the second fin and a second surface formed for each conduit, each second abutment surface being in contact with the respective second surface of the conduits in the closed position.

Advantageously, but not restrictively, the third device for limiting the range of the hinge member includes at least one lug disposed on each first portion and second portion and an abutment face with a groove arranged on the outer wall of the hinge member and wherein the spur is capable of sliding, the abutment face being in contact with the spur in the closed position.

Advantageously, but not limited to, the hinge including male and female hinge leaves, the third device of limiting the range of the anchoring member includes at least one contact surface arranged on each male and female hinge leaf and a bottom of a receptacle arranged in the hinge member, the contact surface being arranged to come into resting contact with the bottom when transitioning from the open position to the closed position.

Some embodiments also relate to eyeglasses including an optical cover and two temples each of which is connected to a pin of the optical cover, eyeglasses including at least one hinge having any of the aforementioned features and electronic and/or an electrical information transfer device configured to pass through the conduits of the first portion and the second portion and the port of the hinge member. Thus, the eyeglasses, called connected eyeglasses, allow the transfer of information through a hinge which protects and provides guidance for the electric and/or electronic information transfer device. Also, the eyeglasses have a normal aesthetic appearance.

BRIEF DESCRIPTION OF THE DRAWINGS

Other innovative features and advantages will be apparent from the following description, provided for information only and in no way restrictive, with reference to the accompanying drawings, wherein:

FIG. 1 is a front view of a first embodiment of a hinge for eyeglasses in the open position;

FIG. 2 is a rear view of first embodiment of a hinge in the open position;

FIG. 3 is a right side view of the hinge according to the first embodiment;

FIG. 4 is an exploded view of the hinge according to the first embodiment;

FIGS. 5, 6a and 6b are detail views in partial perspective of the first portion and the second portion according to the first embodiment;

FIGS. 7 to 9 are respectively perspective, front and rear views of an example of a hinge member;

FIGS. 10 to 12 are sectional views of the hinge according to the first embodiment respectively in the open, partially closed and closed positions;

FIG. 13 is an exploded view of the hinge according to a second embodiment;

DETAILED DESCRIPTION OF EXEMPLARY EMBODIMENTS

Figure 14:
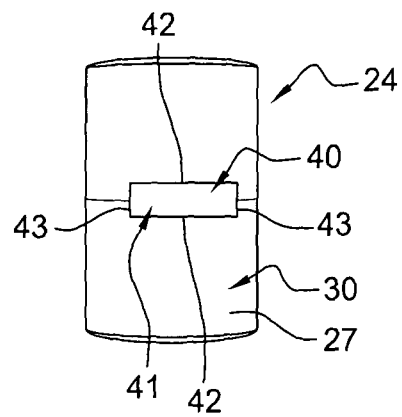
FIG. 14 is a bottom view of a hinge member according to the second embodiment.
Figure 15:
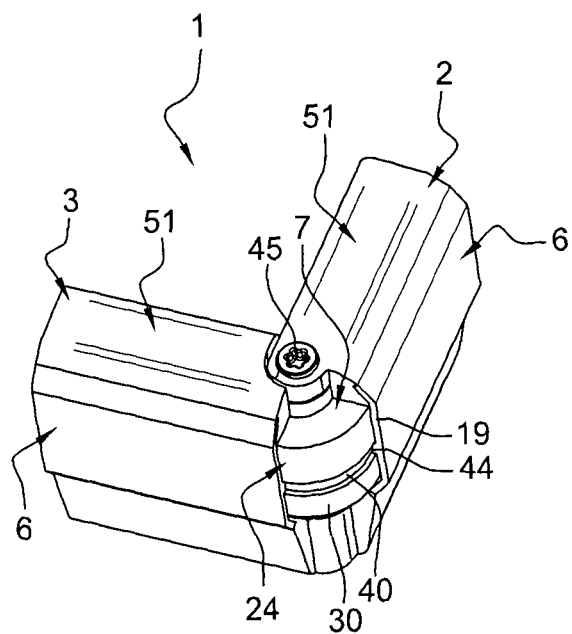
FIG. 15 illustrates the hinge in perspective according to the second embodiment in the closed position.
Figure 16:
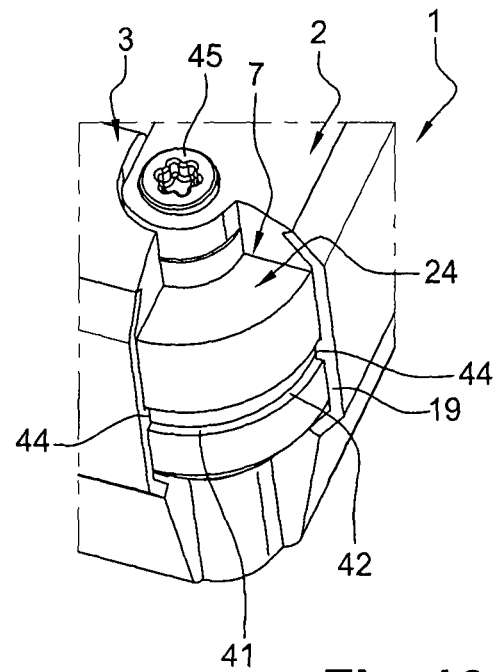
FIG. 16 shows in a detail view the range limiting device of the hinge member.

In FIGS. 1 to 10 a first embodiment of a hinge 1 for eyeglasses 100 according to one invention is illustrated.

In reference to FIG. 1 and in general, the eyeglasses 100 include an optical cover 101 and at least one temple 102 connected to a pin 103 of the optical cover 101. The optical cover 101 also includes lenses 104 for vision correction and/or sun protection and/or display. The hinge 1 includes a first portion 2 connected to the pin 103 and a second portion 3 connected to the temple 102. In the context of the present invention, the connected eyeglasses 100 include an electronic and/or electrical device which include electronic and/or electrical components configured to interact with the optical cover 101 and a device for transferring electronic and/or electrically information connecting the electronic components with a power source mounted to the arm 102.

To facilitate understanding, we consider that the temple 102 extends along a horizontal X longitudinal axis. Also shown is the vertical axis Z that is perpendicular to the longitudinal X axis and a transverse axis Y so that these three axes X, Y, Z form a direct orthogonal coordinate system as illustrated in FIG. 1. The terms "lower", "upper", "top" and "bottom" are defined with respect to the vertical axis Z, and the term "lateral" is defined in relation to the X axis.

The first portion 2 and second portion 3 each include an inner surface 5 visible in particular in FIG. 2 and which is turned towards the inside of the eyeglasses 100 and an outer surface 6 shown in FIG. 1 facing the external environment of the eyeglasses 100. Each outer surface 6 is opposite to each inner surface 5 along the transverse Y axis. Each first portion 2 and second portion 3 includes a body having a substantially parallelepiped shape. However, this shape may be different as long as it matches the temple 102 and the pin 103 and allows pivoting of the first portion and the second portion. In particular, each first portion 2 and second portion 3 includes an inner side 11 which are arranged opposite each other. Each first portion 2 and second portion 3 also includes an outer side 12 shown in FIG. 3 which is opposite to the inner side 11 along the longitudinal X axis.

In reference to FIG. 4, each first portion 2 and second portion 3 includes a conduit 8 passing through the body thereof, and in particular, from the inner side 11 to the outer side 12. One temple tip 102 is installed in part of the conduit 8 of the second portion 3 and one end of the pin 103 is installed in part of the conduit 8 of the first portion 2. Each conduit 8 of the first portion 2 and second portion 3 forms a first surface 9 and a second opposite surface 10 (along the transverse Y axis with reference to FIG. 4) and facing each other. The first 9 and second 10 surfaces are defined in planes B, B' parallel to the axes of the plane X and Z. In this embodiment, the conduits 8 have a rectangular section.

The first portion 2 and second portion 3 are connected by a connector 4. The connector 4 is mounted along a hinge axis A, parallel to the vertical axis Z, as shown in FIG. 2. The first portion 2 and second portion 3 are movable along this hinge axis between an open position illustrated in FIGS. 1, 2, 8 and a closed position illustrated in FIG. 10. In order to accommodate the hinge between the first portion 2 and second portion 3, second portion 3 includes two first knuckles 13 each including an axis D cylindrical housing 23. The first knuckles 13 are spaced from one another along the vertical axis Z. Each first knuckles 13 is intended to engage between two second knuckles 14, 14' arranged on the first portion 2. Each second knuckles 14, 14' also includes a cylindrical housing 49 of axis H. The cylindrical housing 49 of the two second knuckles 14' which are internal have a section smaller than that of the two second knuckles 14 which are external. Furthermore, the cylindrical housing 49 of the two second knuckles 14' includes a threaded bore 53. When the first knuckles 13 and the second knuckles 14, 14' are engaged, the axes H and D of the cylindrical housings 23, 49 are coaxial. Alternatively, the first knuckles 13 can of course be arranged on the first portion 2 and second knuckles 14, 14' may be arranged on the second portion 3. In the same way, the threaded bore 53 may be formed in the cylindrical housing of the external second knuckles 14 rather than the cylindrical housing of the internal second knuckles 14' or in the cylindrical housing of the first knuckles 13.

The connector 4 includes two screws 50 mounted along the hinge axis A. Any other similar device may be envisaged for the assembly and the rotation of the first portion 2 and second portion 3. Each screw 50 includes a head 15 and a body 16 elongated along an axis G coaxial with the hinge axis A. The body 16 of a screw 50 is engaged in the cylindrical housing 23, 49 of the two second knuckles 14, 14' and a first knuckle 13 situated at an upper side 51 of the first portion 2 and second portion 3 and the body 16 of the other screw 50 is engaged in the cylindrical housings 23, 49 of two second knuckles 14, 14' and a first knuckle 13 is situated at a lower side 52 of the first portion 1 and second portion 3. In particular, the body 16 of each screw 50 includes a first portion 17 on which the first knuckle 13 and the second knuckle 14 (external) are pivoted. Each screw body 16 also has a second portion 18 including a threading 54 for engaging with the threaded bore 53 of the cylindrical housing 49 of each second knuckle 14' (internal). Each screw 50 also includes a tip 55 situated at the free end of the body 16. The pin 51 has a section smaller than the body 16 of the screw 50.

In the open position, the first and second portions are aligned along the longitudinal X axis. In particular, the outer surfaces 6 of each first portion 2 and second portion 3 are flush respectively in the open position. The conduits 8 also emerge one next to the other when the first 2 and the second 3 parts are in the open position. In contrast, in the closed position, the first portion 2 is aligned along the X axis and the second portion 3 is aligned along the Y axis perpendicular to the X axis.

When switching from the open position to the closed position, an opening 7 is formed between the outer surface 6 of the first portion 2 and the outer surface 6 of the second portion 3 (cf. FIGS. 11, 12, 15 and 16). We understand by the term "opening" in the present invention a space that is created/formed when the first portion 2 and second portion 3 are not aligned (in this case along the longitudinal X axis), this space also being included between the two internal second knuckles 14' and/or the external surfaces 6 are no longer flush.

Figure 6B:
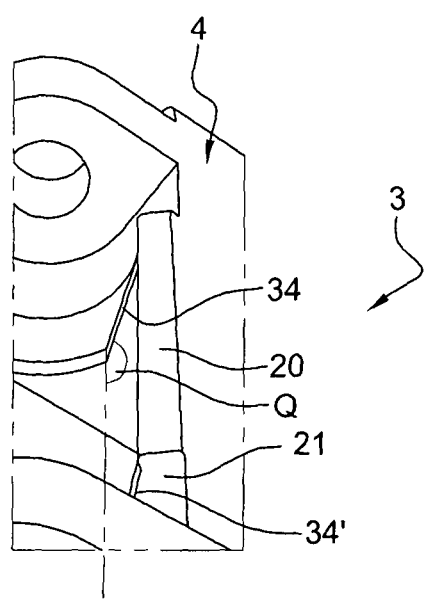

In reference to FIGS. 5, 6a and 6b, the first portion 2 and second portion 3 each include an opening abutment surface 19 and a closure abutment surface 20. Each first portion 2 and second portion 3 includes a bulge 21 on an edge of an inner border 22 surrounding each conduit 8. The bulge 21 is located in particular between the inner surface 4 and the edge of the inner border 22 of each first portion 2 and second portion 3. This bulge 21 extends along the Z axis with reference to FIGS. 4 and 5 between the two inner second knuckles 14' of the first portion 2. On the second portion 3, the bulge 21 extends along the Z axis with reference to FIGS. 4, 6a and 6b between the first two knuckles 13. Each bulge 21 carries the closure abutment surface 20. The latter is defined in a plane transverse to the XZ plane of the inner surface 4 formed by the axes X and Z corresponding to each first portion 2 and second portion 3. The closure abutment surfaces 20 are arranged one next to the other. The opening abutment surface 19 are each carried by an inner side 11 of each first portion 2 and second portion 3. Each opening abutment surface 19 is defined in an YZ plane formed by the Y and Z axes and perpendicular to the XZ plane of each inner surface 4. The opening abutment surfaces 19 are arranged one next to the other. The opening abutment surfaces 19 are adapted to be in contact in the open position.

The hinge 1 includes a hinge member 24 which is mounted along the axis of the hinge A between the first portion 2 and second portion 3. The hinge member 24 is arranged to follow the pivoting of the first portion 2 and second portion 3. For this purpose, the hinge member 24 has a body extending along a longitudinal axis O. The body here has a cylindrical shape. The longitudinal axis O is parallel to the axis Z according to FIG. 4. The body has a substantially trapezoidal section with rounded bases. More specifically, the body has an upper face 25 and a lower face 26 opposed along the axis O and is connected by an outer wall 27. The upper 25 and lower 26 surfaces are defined in parallel planes. These planes are each perpendicular to the longitudinal axis O. Each upper 25 and lower 26 face is provided with a hole 28 of axis C. Each hole 28 receives the tip 55 of the screw 50 on which the hinge member 24 is pivotably mounted between the first portion 2 and second portion 3. Thus, the hinge member 24 pivots about the hinge axis A in a predetermined range between the open position and the closed position.

The outer wall 27 seals the opening 7 in any position between the open and closed position. The outer wall 27 includes at the location of the rounded bases a first wall portion 29 and a second wall portion 30. In other words, the outer wall 27 has a first curvature and a second curvature corresponding to the directional arch of the cylinder according to a section perpendicular to the longitudinal axis O of the hinge member 24. The first wall portion 29 has the first curvature and the second wall portion 30 has the second curvature. The second wall portion 30 closes the opening 7 formed between the outer surfaces 6 of the first portion 2 and second portion 3 when they rotate abound the articulation axis A between the closed position and open position.

The first wall portion 29 closes another opening 7' formed between the inner surfaces 5 of the first and second portions.

In reference to FIGS. 7-9, the hinge member 24 also includes a port 31 passing through the body in a direction transverse to the longitudinal axis O. In particular, port 31 has a curved direction substantially parallel to the second curvature of the outer wall 27. The holes 28 open into the port 31. The port 31 allows the passage of an electronic and/or electrical information transfer device such as a flexible cable through the hinge 1 which thus serves as guide.

According to one characteristic, the hinge 1 includes the predetermined range limiting device for the hinge member 24 between the open position and the closed position. In particular, the limiting device includes the first limitation device of the predetermined range of the hinge member 24 in the open position. The first limiting device includes at least two lateral surfaces 32, 32' provided on the outer wall 27 of the hinge member and at least two lateral faces 34, 34' provided respectively on the first portion 2 and second portion 3. More specifically illustrated in FIGS. 4 to 7, the hinge member 24 has four lateral surfaces 32, 32' disposed on either side of the longitudinal axis O. Each lateral surface 32, 32' connect the first wall portion 29 and the second wall portion 30. In other words, each lateral surface 32, 32' is located on two opposite edges of one of the borders 33 of the slot 31 in the direction of the longitudinal axis O. Two lateral surfaces 32, 32' of the hinge member 24 are located on each side of the outer wall 27 and are defined in the same plane P (see FIG. 7). The lateral surfaces 34, 34' of each first portion 2 and second portion 3 are located on the inner border 22 of each conduit 8. These 34, 34' are situated on two opposite edges (along the Z-axis) of the inner border 22 of the first portion 2 and also the second portion 3. Similarly, two lateral faces 34, 34' of each first portion 2 and second portion 3 are defined in a same plane Q (cf. FIG. 6b). Each lateral surface 32, 32' is adapted to be in contact with one of the lateral faces 34, 34' of the first portion 2 or second portion 3 in the open position. The Q plane of the lateral faces 34, 34' of each first portion 2 and second portion 3 is parallel to the plane P of the corresponding lateral surfaces 32, 32' situated opposite the lateral faces 34, 34' in the open position.

The limiting device includes the second devices for limiting the predetermined range of the hinge member 24 in the open position. The second limiting device includes at least a first abutment surface 37 arranged on the side, respectively, of a first fin 35 and a second fin 36 of at least one pair of fins and the first surface 9 formed by each conduit 8. In reference to FIGS. 4-9, the hinge member 24 is provided with two pairs of fins each of which is arranged at the location of one of the lateral surfaces 32, 32' of the hinge member 24. The first fin 35 and the second fin 36 of the same pair are each arranged on one side of the hinge member 24 with respect to the longitudinal axis O. Here, the first fins 35 of the two pairs are located at opposite edges of one of the borders 33 of the port 31 in the direction of the longitudinal axis O. The arrangement of the second fins 36 of the two pairs is identical. The first fins 35 extend inside of the conduit 8 of the second portion 3. Similarly, the second fins 36 extend inside the conduit 8 of the first portion 2. Each first wing 35 and second wing 36 has a substantially triangular section with a base and two sides. The base is located on a lateral surface 32, 32'. This allows for continuity with the second wall portion 30 and one of the sides of the fins and thereby makes the hinge member 24 pivotable within the conduits 8.

One side of each first fin 35 and second fin 36 has the first abutment surface 37 and the other side is provided with the second abutment surface 38. The first abutment surfaces 37 are defined in a plane E (see FIG. 7). The second abutment surfaces 38 are also defined in the same plane F (see FIG. 7). The second abutment surfaces 38 are adjacent to the second wall portion 30 of the hinge member 24. Each first abutment surface 37 is adapted to be in contact with the first surface 9 of the respective conduits 8 in the open position, as described below.

The limiting device further includes third range limiting device for the hinge member 24 in the closed position. The third range limiting device for the hinge member 24 includes the second abutment surface 38 of the first fin 35 and the second fin 36 and the second surface 10 formed by each conduit 8. Each second abutment surface 38 is adapted to be in contact with the second respective surface 10 of the conduits 8 in the closed position as described below.

In FIG. 10, the first portion 2 and second portion 3 are in the open position. In this position, the port 31 is aligned with the conduits 8. In fact, the conduits 8 extend along the X axis. Each of the first abutment surfaces 37 is in contact or in abutment with a first surface 9 of each conduit 8. The plane E of the first abutment surfaces 37 is parallel to the plane B of the first surfaces 9 of the conduits 8 in the open position. In this embodiment, the plane B is parallel to the XZ plane. The first wall portion 29 closes the opening 7' between the inner surfaces 5 of the first portion 2 and second portion 3. The second wall portion 30 is inside the conduits 8. The latter is in contact with the second surface 10 of each conduit 8. Furthermore, the opening abutment surfaces 19 are in contact with each other. In other words the opening abutment surfaces 19 abut against each other.

In FIG. 11 is shown in a position between closed and open. In this intermediate position, the conduits 8 are not aligned. The plane B of the first surface 9 of the second portion 3 form an angle of between 90° and 180° with the plane B of the first surface 9 of the first portion 2. In this position, the first abutment surface 37 of the first fin 35 is in contact with the first surface 9 of the conduit 8 of the second portion 3 and the second abutment surface 38 of the second fin 36 is in contact with the second surface 10 of the conduit 8 of the first portion 2. The second wall portion 30 closes the opening 7 formed between the respective outer surfaces 6 of the first portion 2 and second portion 3. Moreover, the opening abutment surfaces 19 are at a distance from each other.

In FIG. 12 is illustrated in the closed position of the first portion 2 and second portion 3. In this intermediate position, the conduits 8 are not aligned. In particular, the plane B of the first surface 9 of the first portion 2 is perpendicular to the plane B of the first surface 9 of the second portion 3. The second abutment surfaces 38 of the first fins 35 and second fins 36 are in contact with the second surfaces 10 of the conduits 8. More specifically, the plane F of the second abutment surfaces 38 and plane B' of the second surfaces 10 of the conduits 8 are parallel in the closed position. The first abutment surfaces 37 are at a distance from the first surfaces 9. The second wall portion 30 closes the opening 7 formed between the outer surfaces 6 of the first portion 2 and second portion 3. Moreover, the closure abutment surfaces 20 are in contact, i.e. in abutment against each other.

FIGS. 13 to 16 show a second embodiment of a hinge 1. For reasons of clarity and simplification of the description, identical elements of this embodiment are indicated by the same references as those of the first embodiment. In reference to FIG. 14, we see that the hinge member 24 also has a cylindrical body elongated along the longitudinal axis O. The hinge member 24 includes a port 31 passing through the body of the longitudinal axis O in a direction transverse to the longitudinal axis O. In particular, the port 31 extends in a curved direction substantially parallel to the second curvature of the outer wall 27. The hinge member 24 is also connected between the first portion 2 and second portion 3. The connector 4 for the pivoting of the first portion 2 and second portion 3 and the hinge member 24 in this embodiment has a screw 45 mounted along the hinge axis A. The screw 45 includes a head 46 and a body 47 elongated along an axis G' parallel to the Z axis with reference to FIG. 13. In this second embodiment, the length of body 47 of the screw 45 is greater than the length of the hinge member 24. In this way, the screw 45 passes through the body of the hinge member 24 along the longitudinal axis O through the holes 28. The body 47 of the screw 45 has a thread 54 at the free end thereof. To constitute the hinge, the second portion 3 includes two first knuckles 13 with the cylindrical housing 23 each engaging with a second knuckle 14 of the first portion 2 with the cylindrical housing 49. The cylindrical housing of the second knuckle 14 receiving the free end of the screw 45 is threaded so as to ensure the attachment between the first portion 2 and second portion 3 and the pivoting thereof.

In this second embodiment, the hinge also includes the predetermined range limiting device for the hinge member in the open position and the closed position. Here, the body of the hinge member 24 is devoid of fins on the second and third limiting device in the first embodiment. Referring to FIG. 13, the second limiting device in the opening position includes a longitudinal surface 39 provided on the wall 27 of the hinge member 24 and a longitudinal face 48 that respectively include the first portion 2 and the second portion 3. More precisely, the lateral surfaces 32, 32' extend towards the longitudinal surface 39 extending along the longitudinal axis O of the hinge member 24. The longitudinal surface 39 is intended to abut against the longitudinal side 48 respectively of the first portion 2 and second portion 3 in the open position. The longitudinal side 48 is located on an edge of the border 22 of the conduit 8 of each first portion 2 and second portion 3. The longitudinal side 48 is adjacent the abutment surface in closure 20. The longitudinal surface 39 also makes it possible to re-centre the hinge member 24 in the conduits 8 in the open position.

The third limiting device includes at least one lug 44 disposed on each first portion 2 and second portion 3 and an abutment section 43 of a groove 40 arranged on the outer wall 27 of the hinge member 24. More specifically, the second wall portion 30 includes the groove 40 which is open to the outside and extending in a direction parallel to that of the second curvature. The groove 40 forms a bottom 41, two opposite sides 42 extending in the direction of the second curvature and two opposite abutment sections 43 which are perpendicular to the direction of the second curvature. Here, the groove 40 is rectangular. This groove 40 receives the lug 44 that includes each first portion 2 and second portion 3. More specifically, the lug 44 is provided on the opening abutment surface 19 and is oriented toward the inside of the conduit 8. During the pivoting of the second portion 3 and the hinge member 24 relative to the first portion 2, the lugs 44 slide in the groove 40. When one of the lugs 44 abuts against an abutment section 43, the latter can drive the pivoting of the hinge member 24. The sliding range of the lugs 44 in the groove 40 is limited by the abutment sections 43.

Figure 17:
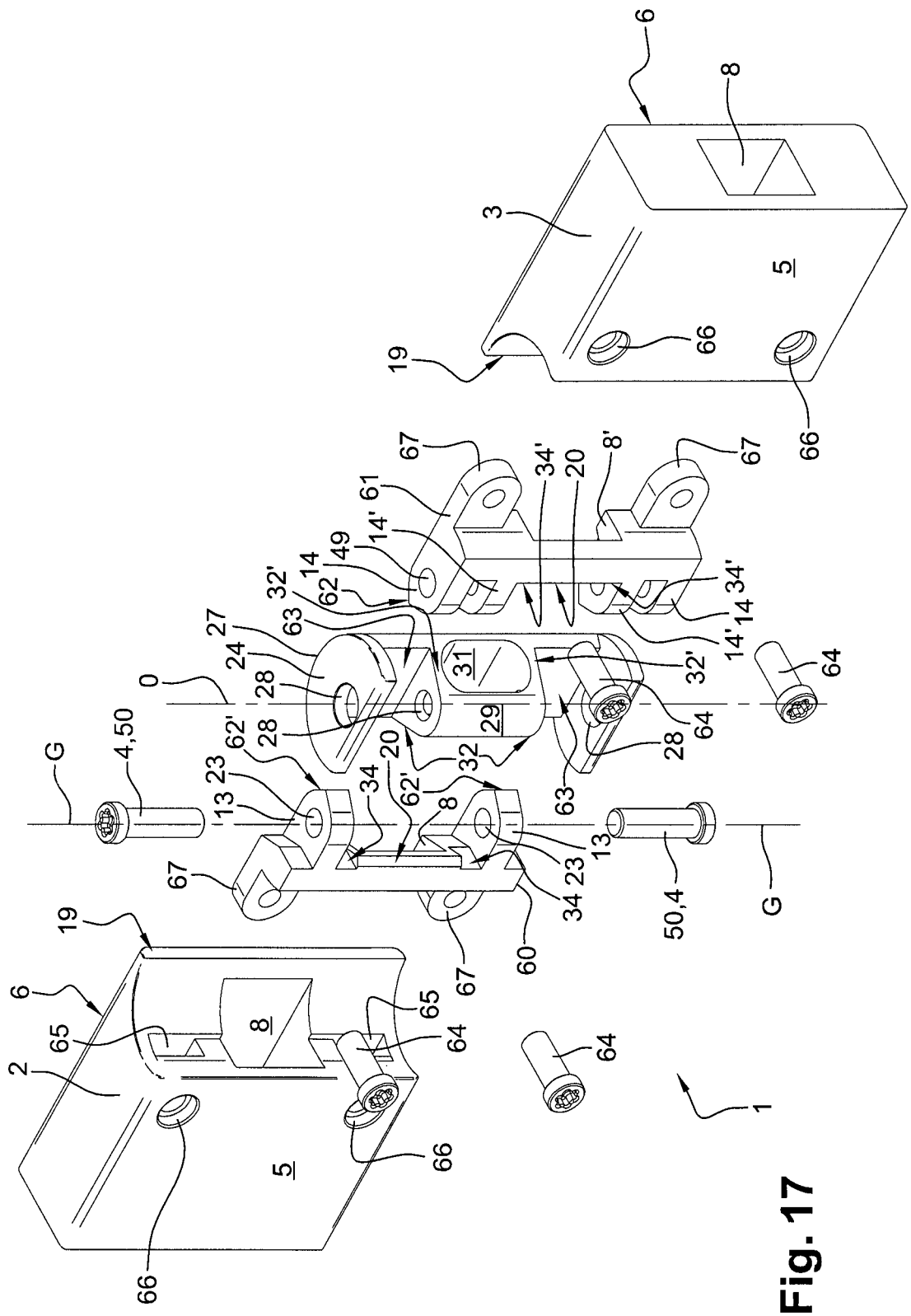
FIG. 17 is an exploded view of the hinge according to a third embodiment.
Figure 18A:
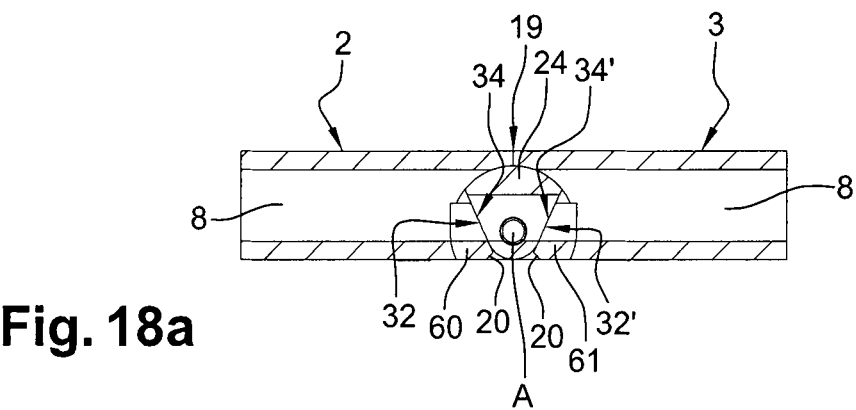
FIGS. 18a to 18c are sectional views of the hinge according to the third embodiment, respectively in the open, partially closed and closed positions.
Figure 18B:
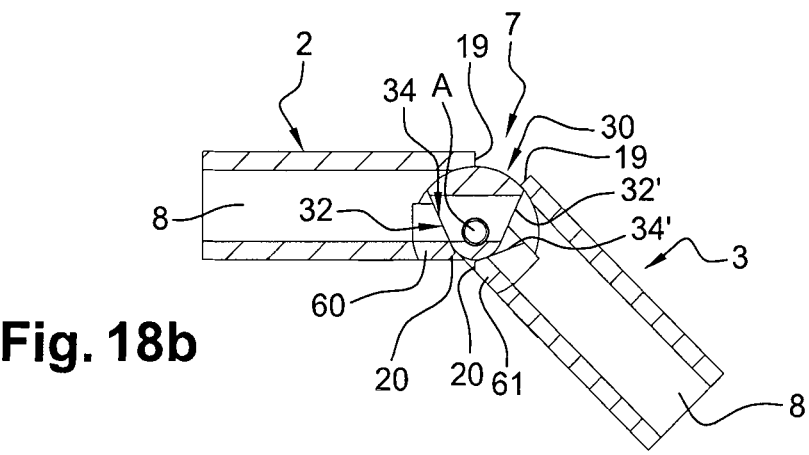
Figure 18C:
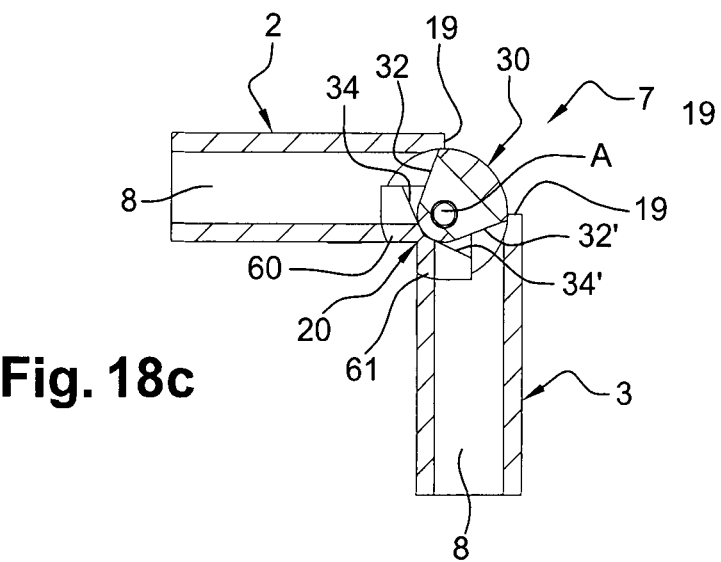

Now, with reference to FIGS. 17 to 18c, we will describe a third embodiment of the hinge 1. Again, for reasons of clarity and simplification of the description, identical elements of this embodiment are indicated by the same references as those of the first and second embodiments described hereinbefore.

In reference to FIG. 17, the hinge member 24 also includes a cylindrical body elongated along the longitudinal axis O. The hinge member 24 includes a port 31 passing through from the body side of the 0 longitudinal axis in a direction transverse to the longitudinal axis O. The hinge member 24 is also mounted between the first portion 2 and second portion 3.

The first portion 2 includes, here, in this third embodiment, a male hinge 60 attached to the first portion 2. For this, the male hinge 60 includes a pair of tabs 67 which are received in the housings 65 designed for the purpose in the first portion 2. The connecting elements 64, here assembly screws are received in holes 66 opening into the housing 65 so as to fix in place the male hinge leaf 60 of the first portion 2. Similarly, the second portion 3 includes, here, in this third embodiment, a female hinge leaf 61 attached to the second portion 3. For this purpose, the female hinge 61 includes a pair of tabs 67 which are received in the housing 65 designed for the purpose in the first portion 2. The connecting elements 64, here assembly screws are received in holes 66 opening into the housing 65 so as to fix in place the female hinge leaf 61 on the second portion 3. In the first embodiment, the male hinge leaf 60 is fixed to the second portion 3 and the female hinge leaf 61 is fixed to the first portion. In yet another variation, the male and female hinge leaves are integral with the portions 2 and 3.

To constitute the hinge, the male hinge leaf 60 includes two first knuckles 13 with the cylindrical housing 23 each engaging with two second knuckles 14 and 14' of the female hinge leaf 61 with the cylindrical housing 49. The cylindrical housing of the second knuckle 13 receiving the free end of the screw 45 is threaded so as to ensure the fixing between the first portion 2 and second portion as well as the pivoting thereof. The arrangement of the hinge is similar to the first embodiment previously described. In the case of the third embodiment, each set of first knuckle 13 and second knuckles 14 and 14' is received in a respective U-shaped receptacle arranged in the hinge member 24. The receptacles here are two in number and positioned along the longitudinal axis O on either side of the port 31. Each of the receptacles has a bottom 63 in the form of a flat surface portion parallel to the longitudinal axis O. Moreover, each U-shaped side wall of the receptacle has a housing 28. The assembly of the hinge is achieved by the insertion of the screws 50, two in number, into each set of the first knuckle 13, of the second knuckles 14 and 14' and U-shaped receptacle. The screws 50 are maintained by a thread provided in at least one of the housings 23, 28, 49 of the sets of the first knuckle 13, of the second knuckles 14 and 14' and U-shaped receptacle.

In this third embodiment, the opening abutment surfaces 19 are situated, as in the first embodiment, at the first 2 and second 3 portions. The closure abutment surfaces 20 are, in turn, situated on the male hinge leaf 60 and female leaf 61. However, the closure abutment surfaces 20 have an additional role which is described a little further below.

In this third embodiment, the hinge also includes the pre-determined range limiting device for the hinge member 24 in the open position and the closed position. The first device for predetermined range limitation of the hinge member 24 in the open position have, similarly to the first embodiment, at least two lateral surfaces 32, 32' provided on the outer wall 27 of the hinge member 24 and at least two lateral faces 34, 34' provided respectively on the male hinge leaf 60 and female hinge leaf 61.

Furthermore, the body of the hinge member 24 is devoid of fins that have the second and third limiting device of the first embodiment. Indeed, in this third embodiment, the hinge 1 has no second limiting device in the open position as defined in the previous embodiments. Regarding the third range limiting device of the hinge member 24 in the closed position, same include bottoms 63 situated on the hinge member 24 as well as contact faces 62 situated on an outer section of the second knuckles 14 and 14' and the contact faces 62' situated in a similar manner, on an outer section of the first knuckles 13.

We will now briefly describe operation of the hinge 1 according to the third embodiment. In the open position, illustrated in FIG. 18a, the opening abutment surfaces 19 are in contact with each other, the surfaces 32, 32' of the first device for the pre-determined range limitation of the hinge member 24 in the open position are respectively in contact with surfaces 34, 34'. The conduits 8 and the port 31 are aligned for the passage of the flexible member 10.

When going into the closed position, upon reaching an intermediate position illustrated in FIG. 18b, the contact faces 62 or 62' of the third device for limiting the range of the hinge member 24 in the closed position come into contact and rest on the bottoms 63. This causes the hinge member 24 to move; while the movement towards the closed position continues, the movement of the hinge member 24 is thus slaved to the male 60 and female 61 hinge leaves.

In the closed position illustrated in FIG. 18c, the closure abutment surfaces 20 abut against each other. In addition to their closing abutment role, the closure abutment surfaces 19, once in contact, make it possible to preserve the contact faces 62 and 62' from wear and deformation. This avoids abutting when closed by the simultaneous contact of the contact faces 62 and 62' with the bottoms 63.

When switching into the open position, upon reaching an intermediate position, the surfaces 32 or 32' come into contact with the surfaces 34 or 34' respectively. This causes the hinge member 24 to move again; while the movement towards the opening position continues, the movement of the hinge member 24 is again slaved to the male 60 and female 61 hinge leaves.

Thus, according to the embodiments described below, devices for transferring electrical and/or electronic information such as a flexible cable 110 can be installed through the conduits 8 of the first portion 2 and second portion 3 and through the port 31 of the hinge member 24. The hinge member 24 allows in any position between the position of opening and closing for the flexible cable to be guided while avoiding the constraints that the latter undergoes, particularly during the transition from the open position to the closed position and vice versa. Such a configuration guarantees a flexible curvature radius of the cable in the closed position greater than or equal to 10 mm.

Some embodiments are described in the foregoing by way of example. It is understood that a person of ordinary skill in the art is capable of producing various alternative embodiments, such as combining the different aforementioned characteristics taken alone or in combination, without departing from the scope of the currently disclosed subject matter.

The invention claimed is:

1. A hinge of eyeglasses that includes an optical cover and at least one temple connected to a pin of the optical cover, the hinge comprising:
   a first portion connected to the pin;
   a second portion connected to the temple; and
   a connector that connects the first portion and the second portion, the connector being mounted along a hinge axis and being movable between an open position and a closed position, an opening being formed between outer surfaces of the first and the second portion when the hinge moves from the open position to the closed position;
   the first and second portions each including a conduit opening opposite one another in the open position, and the hinge including a hinge member mounted along the axis of the hinge between the first portion and the second portion, the hinge member including an outer wall closing the opening in all positions between the open or closed position.

2. The hinge according to claim 1, wherein the first portion and the second portion each include an opening abutment surface and a closure abutment surface disposed respectively one facing the other, the opening abutment surface being adapted to be in contact in the open position and the closure abutment surfaces being adapted to be contacted in the closed position.

3. The hinge according to claim 2, wherein the connector includes two screws mounted along the axis of the hinge.

4. The hinge according to claim 2, wherein the connector includes a screw mounted along the axis of the hinge.

5. The hinge according to claim 2, further comprising a first range limiting device of the hinge member in the open position.

6. The hinge according to claim 1, wherein the connector includes two screws mounted along the axis of the hinge.

7. The hinge according to claim 6, wherein the hinge member has a longitudinal axis and at least two holes the axes of which are parallel to the longitudinal axis, a link member being pivotally mounted on the screw(s) by holes over a determined range between the open position and the closed position.

8. The hinge according to claim 7, wherein the hinge member includes a port passing through the body of the hinge member on both sides.

9. The hinge according to claim 6, further comprising a first range limiting device of the hinge member in the open position.

10. The hinge according to claim 1, wherein the connector includes a screw mounted along the axis of the hinge.

11. The hinge according to claim 10, wherein the hinge member has a longitudinal axis and at least two holes the axes of which are parallel to the longitudinal axis, a link member being pivotally mounted on the screw(s) by holes over a determined range between the open position and the closed position.

12. The hinge according to claim 1, further comprising a first range limiting device of the hinge member in the open position.

13. The hinge according to claim 12, wherein the first device for limiting the range of the hinge member includes at least two lateral surfaces arranged on the outer wall of the hinge member on either side of the longitudinal axis of the hinge member and at least two lateral faces respectively disposed on a first portion and second portions.

14. The hinge according to claim 12, further comprising a second range limiting device of the hinge member in the open position.

15. The hinge according to claim 14, wherein the second range limiting device of the hinge member includes:
   a first abutment surface disposed on one side respectively of a first fin and a second fin of at least one pair of fins; the first fin and the second fin being disposed on the outer wall of the hinge member on either side of the longitudinal axis; and
   a first surface formed by each conduit, each first abutment surface being in contact with the first surface of the respective conduits in the open position.

16. The hinge according to claim 15, further comprising a third range limiting device of the hinge member in the closed position,
   wherein the third range limiting device of the hinge member include a second abutment surface arranged respectively on one side of the first fin and the second fin and a second surface formed by each conduit, each second abutment surface being in contact with the second respective surface of the conduits in the closed position.

17. The hinge according to claim 14, further comprising a third range limiting device of the hinge member in the closed position.

18. The hinge according to claim 17, wherein the third range limiting device of the hinge member includes at least one lug arranged on each first portion and second portion and an abutment section of a groove disposed on the outer wall of the hinge member and wherein the lug is adapted to slide, the abutment section being in contact with the lug in the closed position.

19. The hinge according to claim 17, wherein the hinge includes male and female hinge leaves, the third range limiting device of the hinge member includes at least one contact face arranged on each male and female hinge leaves and a bottom of a receptacle arranged in the hinge member, the contact face being arranged to come into contact and rest on the bottom during a transition from the open position to the closed position.

20. Eyeglasses, comprising:
   an optical cover;
   two temples, each of which being connected to a pin of the optical cover;
   the hinge according to claim 1; and
   an electronic and/or electrical information transfer device configured to pass through the conduits of the first portion and second portion and port of the hinge member.

* * * * *